United States Patent [19]

Felderman et al.

[11] Patent Number: 5,101,502

[45] Date of Patent: Mar. 31, 1992

[54] WIDE AREA TRUNKED CHANNEL BUSY OVERRIDE

[75] Inventors: William A. Felderman, Cary; Daniel J. McDonald, Hanover Park; Thaddeus A. Kozlowski, Chicago, all of Ill.

[73] Assignee: Motorola, Inc., Schaumburg, Ill.

[21] Appl. No.: 502,725

[22] Filed: Apr. 2, 1990

[51] Int. Cl.[5] .......................... H04Q 7/02; H04B 7/00
[52] U.S. Cl. ........................................ 455/34; 455/53
[58] Field of Search ....................... 455/34, 51, 53, 54, 455/58, 33; 370/85.6; 340/825.5, 825.51; 379/62, 63

[56] References Cited

U.S. PATENT DOCUMENTS

| | | | |
|---|---|---|---|
| 4,360,927 | 11/1982 | Bowen et al. | 455/54 |
| 4,573,207 | 2/1986 | Smith et al. | 455/34 |
| 4,716,407 | 12/1987 | Borras et al. | 455/32 |
| 4,837,858 | 6/1989 | Ablay et al. | 455/34 |
| 4,905,302 | 2/1990 | Childress | 455/34 |

*Primary Examiner*—Reinhard J. Eisenzopf
*Assistant Examiner*—Lisa Charouel
*Attorney, Agent, or Firm*—Timothy W. Markison; Steven G. Parmelee; Joseph P. Krause

[57] ABSTRACT

A typical multi-site trunked communication system comprises communication units that are arranged into talk groups, communication resources distributed among communication sites, and a communication resource allocator. In such a system, a methodology is incorporated that allows communication units to override communication site busy conditions, where the communication site busy conditions prohibits placement of group calls until all communication sites have an available communication resource. The communication site busy condition may be overridden by a communication unit by initiating a busy override signal. Once the busy override signal is initiated, the communication resource allocator allocates, in each site, a communication resource to the communication group of the requesting communication unit.

11 Claims, 2 Drawing Sheets

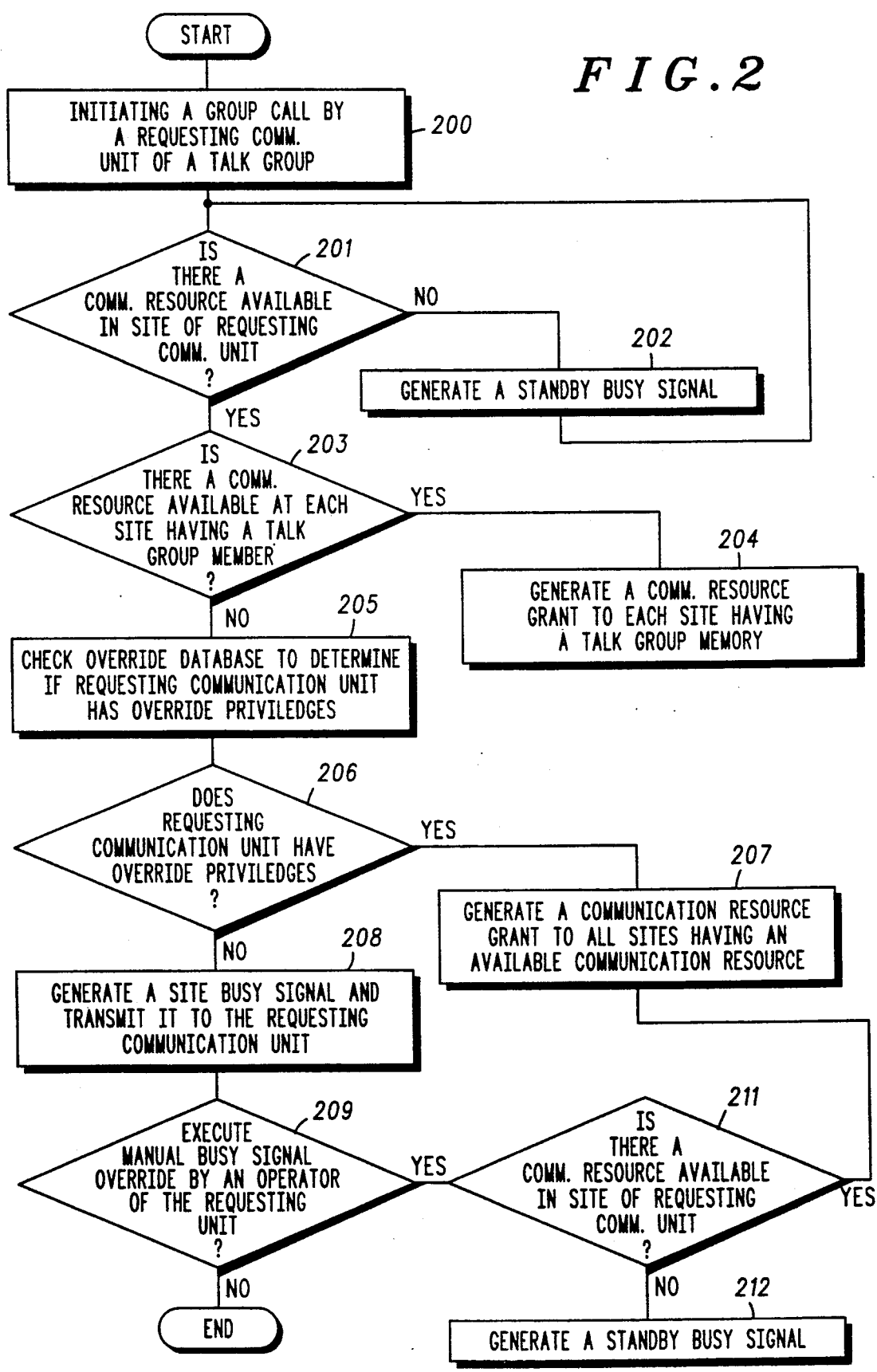

WIDE AREA TRUNKED CHANNEL BUSY OVERRIDE

TECHNICAL FIELD

This invention relates generally to trunked communication systems and in particular to wide area trunked communication systems that allow communication units to override site busy signals.

BACKGROUND OF THE INVENTION

Typically, a multi-site trunked communication system (system) comprises communication units, communication resources, communication sites (sites), and a communication resource allocator. Each of the sites have a substantially distinct coverage area and are geographically located throughout the system. Each site also has a number of communication resources assigned to it, where at least one of the communication resources is used as a control channel, while the remaining communication resources are used as voice channels. The communication resources may be telephone connections, TDM times slots, carrier frequencies, and/or frequency pairs.

The communication units are typically arranged into communication groups (talk groups) and may be located any where within the system (in any site). When a communication unit of a talk group requests a group call, it transmits, via a control channel of the site in which it is located, an inbound signalling word (ISW) to the communication resource allocator. (A group call typically allows all members of the same talk group that are located within the system to communicate with each other.) The ISW generally comprises the requesting communication unit's individual identification number, the requesting communication unit's talk group, and a request for a group call. The ISW may also contain more or less information depending on the system, nevertheless, the above mentioned ISW will suffice for this disclosure.

Upon receiving the ISW, the communication resource allocator will determine if there is an available voice channel in each site. If a voice channel is not available in each site, the communication resource allocator will not place the group call and will transmit an outbound signalling word (OSW) to the requesting communication unit. The OSW generally comprises, at least, a site busy signal which indicates that the group call was not placed because at least one site did not have an available voice channel. When a voice channel becomes available in each site and the requesting communication unit has not cancelled the group call request, the communication resource allocator will allocate a voice channel in each site to the requesting communication unit's talk group.

The placement of the group call may be substantially delayed if the system has a relatively high volume of calls. Under certain situations, the delay may not be acceptable. Further, in many situations, the requesting unit does not need to communicate with all the members of its talk group. For example, if an operator of the requesting communication unit is a police officer who desires to talk to a dispatcher, but no other members of his talk group (other police officers in his district), he must wait until a voice channel is available in all sites. Many systems address this problem by establishing a call priority queue which gives priority to a predetermined set of calls. However, even though the talk group has priority, it must wait until all sites have an available voice channel, which, in a system that has a relatively high volume of calls, may still be a substantial delay.

Another solution is disclosed in co-pending patent application having a Ser. No. of: 07/454,496; filing date of: Dec. 21, 1989; and is entitled: CHANNEL ASSIGNMENT METHOD FOR MULTI-SITE TRUNKED RADIO SYSTEM. In this application, the communication resource allocator only checks sites that have a member of the requesting communication unit's talk group within it. Thus, by checking only the sites having members of a talk group within it, the delay in allocating voice channels may be reduced. However, if a voice channel is not available in all the sites that have a member of the talk group within it (site busy condition), the group call will not be placed until all such sites have an available voice channel.

Therefore, a need exists for a method that will allow a requesting communication unit to override a site busy condition such that the requesting communication unit may transmit its message to as many members of the talk group as possible without having to wait for a voice channel to become available in each site having a member of the talk group within it. The need becomes even more enhanced when at least some of the sites have a relatively small number of voice channels.

SUMMARY OF THE INVENTION

These needs and others are substantially met by the wide area trunking channel busy override method disclosed herein. A typical wide area, or multi-site, trunked communication system comprises communication units that are arranged into communication groups, communication resources that are distributed among communication sites, and a communication resource allocator that controls allocation of the communication resources among the communication units. The wide area trunked communication system is improved to comprise a method that allows a communication unit to override a site busy condition. The method comprises initiating a request for a group call by a requesting communication unit. Upon receiving the group call request, the communication resource allocator establishing a communication site busy condition when a communication resource is not available in at least one communication site. The communication resource allocator may override the busy condition by allocating communication resources in the communication sites that have an available communication resource but only upon receiving a busy override signal from the requesting communication unit and when there is an available communication resource in the communication site that the requesting communication unit is located in.

An aspect of the present invention includes having the communication resource allocator comprise an override database. The override database comprises override information regarding each talk group and/or each communication unit in a talk group. With the override database, the communication resource allocator may automatically override the communication site busy condition when the requesting communication unit is identified in the override database as having override priorities.

An other aspect of the present invention includes having the requesting communication unit receive a site busy signal from the communication resource allocator. The site busy signal indicates that at least one communication site does not have an available communication resource. Upon receiving the site busy signal, an operator of the requesting communication unit may manually execute the busy override signal, thus, enabling the communication resource allocator to override the communication site busy condition.

BRIEF DESCRIPTION OF THE DRAWINGS

FIG. 2 illustrates a logic diagram of the present invention that may be utilized by the multi-site trunked communication system of FIG. 1.

BEST MODE FOR CARRYING OUT THE INVENTION

Figure 1:
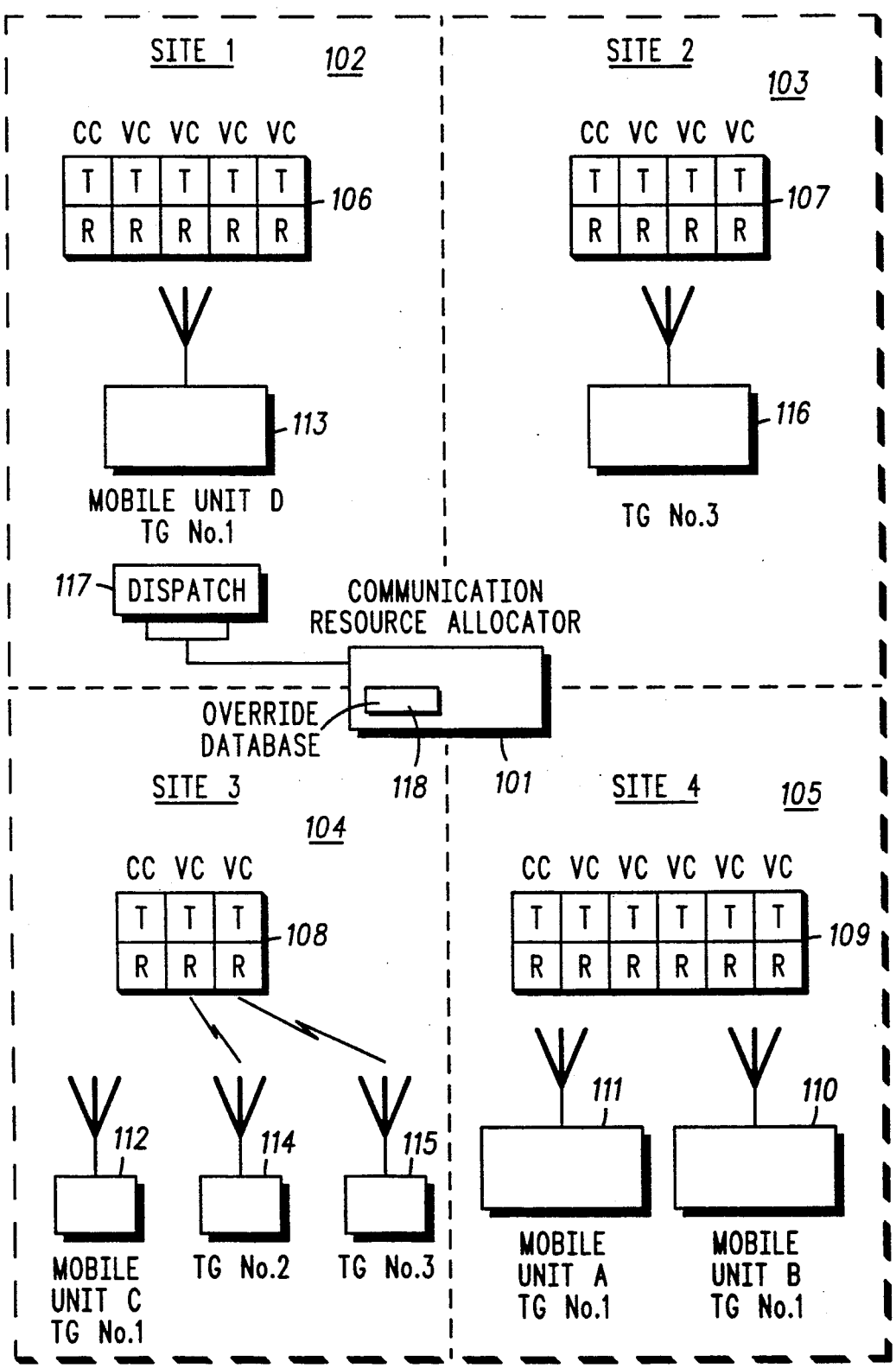
FIG. 1 illustrates a multi-site trunked communication system that incorporates the present invention and comprises communication sites, communication units, and a communication resource allocator.

FIG. 1 illustrates a multi-site trunked communication system that incorporates the present invention. The multi-site trunked communication system (100) comprises communication sites (102-105) (four shown: site 1, site 2, site 3, and site 4), communication resources at each site (106 at site 1, 107 at site 2, 108 at site 3, and 109 at site 4), communication units (110-116), a dispatcher (117), and a communication resource allocator (101) having an override database (118). Communication units 110-113 are referenced as mobile units A, B, C, and D and comprise a talk group, designated TG No. 1. Communication unit (114) comprises a second talk group, designated TG No. 2, and communication units 115 and 116 comprise a third talk group, designated TG No. 3. Control channels in each site (102-105) are designated as CC, while the remaining communication resources comprise voice channels. In practice, the present invention may be implemented into a multi-site trunked communication system that may have more or less sites, communication units, and/or communication resources without substantially interfering with the execution of other trunked communication system functions.

Generally, the present invention allows a requesting communication unit to automatically, or manually, override a communication site busy condition, where a communication site busy condition prevents a group call from being placed until all sites have an available communication resource (voice channel). Upon receiving a busy override signal from the requesting communication unit, the communication resource allocator will allocate voice channels to the requesting communication unit's talk group in every site that has an available voice channel, provided that the requesting communication unit is in a site that has an available voice channel. Once a voice channel becomes available in the remaining sites, the communication resource allocator will allocate a voice channel to the requesting communication unit's talk group, provided that the group call is still active. If the busy override signal is executed automatically, the communication resource allocator will check an override database (118) to determine if the requesting communication unit has override priorities, or capabilities. If the requesting communication unit has override priorities, the communication resource allocator (101) will automatically allocate voice channels in each site that has at least one available.

The busy override signal may also be generated manually. If the requesting communication unit is equipped with manual override capabilities, it will receive a site busy signal from the communication resource allocator. Upon receiving the site busy signal, an operator of the requesting communication unit may manually override the site busy condition if he does not mind that some of his talk group may be in sites that do not have an available voice channel. When the busy override signal is manually activated, the communication site busy condition is overridden identically to the automatic override process.

As an illustrative example of a system that incorporates the teachings of the co-pending patent application entitled CHANNEL ASSIGNMENT METHOD FOR MULTI-SITE TRUNKED RADIO SYSTEM, assume that mobile unit A (110) requests a group call. Upon receiving the request, the communication resource allocator (101) determines if a voice channel (109) is available in site 4 (105). If a voice channel is available (109) in site 4 (105), the communication resource allocator (101) determines if a voice channel is available in sites 1 and 3 (102 and 104). (If the multi-site trunked communication system does not incorporate the teachings of CHANNEL ASSIGNMENT METHOD FOR MULTI-SITE TRUNKED RADIO SYSTEM, site 2 would also be checked for an available voice channel.) After checking each site, the communication resource allocator (101) would determine that site 3 (104) does not have an available voice channel resulting in a site busy condition. To override the site busy condition, a busy override signal must be, either manually or automatically, initiated. Once the site busy override signal is initiated, the communication resource allocator will allocate a voice channel in sites 1 and 4 (102 and 105). If, before TG No. 1's group call ends, a voice channel becomes available in site 3 (104), the communication resource allocator (101) will allocate an available voice channel to TG No. 1.

FIG. 2 illustrates a logic diagram of the present invention that may be incorporated into a multi-site trunked communication system that incorporates the teachings of CHANNEL ASSIGNMENT METHOD FOR MULTI-SITE TRUNKED RADIO SYSTEM. At step 200, a requesting communication unit, within a communication site, requests a group call for its talk group. Upon receiving the group call request, the communication resource allocator determines if a voice channel is available in the requesting communication unit's site (201). If a voice channel is not available (201), a standard busy signal is generated which indicates that a voice channel is not available (202). If a voice channel is available in the requesting communication unit's site (201), the communication resource allocator determines if a voice channel is available at each site having a member of the talk group located within it (203). If a voice channel is available in each site (203), the communication resource allocator allocates a voice channel in each site to the talk group. If a voice channel is not available at each site (203), the communication resource allocator checks an override data base to determine if the requesting communication unit has override privileges (205). (The override database may be a fixed or reprogrammable memory device or a microprocessor.) If the requesting communication unit is identified as having override privileges (206), the communication resource allocator allocates a voice channel in all the sites that have one available.

If the requesting communication unit is not identified as having override privileges (206), the communication resource allocator generates a site busy signal and transmits it to the requesting communication unit (208). At step (209), an operator of the requesting communication unit may execute a manual busy override signal, but only if the requesting communication unit is equipped with a busy override method, or algorithm, that allows the communication unit to generate a busy override signal in accordance with this description. (The busy override method, or algorithm, may be stored in existing memory and/or in additional memory of the communication unit.) If the operator does not manually execute the busy override signal (209), the process ends (210). If the operator does manually execute the busy override signal (209), the communication resource allocator again checks to determine if a voice channel is available in the requesting communication unit's site (211). If a voice channel is available in the requesting communication unit's site (211), the communication resource allocator allocates a voice channel in each of the sites that has one available (207). If a voice channel is not available (211), the communication resource allocator generates a standard busy signal (212).

The present invention may be incorporated into existing trunked communication systems by adding an override data base. Entries into the override data base would consists of identification numbers and talk group numbers of existing communication units, where override privileges would be determined by the user of the trunked communication system.

What is claimed is:

1. In a trunked communication system having communication units that are arranged into communication groups, communication sites, communication resources, and a communication resource allocator, wherein each of the communication sites is assigned at least some of the communication resources, a method for overriding a communication site busy condition comprises the steps of:
   a) initiating, by a requesting communication unit of a communication group, a request for a group call;
   b) establishing, by the communication resource allocator, the communication site busy condition when a communication resource is not available for allocation in at least one communication site; and
   c) allocating, by the communication resource allocator, communication resources in the communication sites that have an available communication resource when a communication resource is available in the communication site that the requesting communication unit is located in and when a busy override signal is initiated.

2. The method of claim 1 wherein step (c) further comprises automatically initiating the busy override signal when the requesting communication unit is identified in an override database as having override priority.

3. The method of claim 1 wherein step (c) further comprises generating, by the communication resource allocator, a communication site busy signal that indicates to the requesting communication unit that the at least one communication site of step (b) does not have an available communication resource.

4. The method of claim 3 wherein step (c) further comprises enabling a manual initiation of the busy override signal when the requesting communication unit receives the communication site busy signal.

5. The method of claim 1 wherein step (c) further comprises allocating a communication resource in the at least one communication site of step (b) when a communication resource becomes available for allocation in the at least one communication site of step (b) and when the group call is still active.

6. The method of claim 1 wherein step (b) further comprises establishing, by the communication resource allocator, the communication site busy condition when a communication resource is not available for allocation in at least one communication site that has a communication unit of the communication group located within it.

7. In a trunked communication system having communication units that are arranged into communication groups, communication resources, communication sites, and a communication resource allocator, wherein each of the communication sites is assigned at least some of the communication resources, a method for a requesting communication unit to override a communication site busy condition comprises the steps of:
   a) initiating a request for a group call;
   b) receiving a communication site busy signal from the communication resource allocator when a communication resource is not available for allocation in at least one communication site; and
   c) initiating a busy override signal when a communication resource has been allocated in the communication site that the requesting communication unit is located in and when the requesting communication unit is enabled to initiate the busy override.

8. The method of claim 7 wherein step (c) further comprises automatically enabling the busy override signal when the requesting communication unit is identified in an override database as having override priority.

9. The method of claim 7 wherein step (c) further comprises receiving a communication site busy signal that indicates that the at least one communication site of step (b) does not have an available communication resource.

10. The method of claim 9 wherein step (c) further comprises manually enabling, by an operator of the requesting communication unit, the busy override signal.

11. The method of claim 7 wherein step (c) further comprises allocating a communication resource in the at least one communication site of step (b) when a communication resource becomes available for allocation in the at least one communication site of step (b) and when the group call is still active.

* * * * *